Sept. 5, 1933.      W. T. GILES      1,925,958
VALVE

Filed Aug. 29, 1932

William T. Giles
INVENTOR

BY Victor J. Evans & Co.
ATTORNEY

Patented Sept. 5, 1933

1,925,958

UNITED STATES PATENT OFFICE 1,925,958

VALVE

William T. Giles, Moberly, Mo.

Application August 29, 1932. Serial No. 630,933

6 Claims. (Cl. 277—34)

The object of the invention is to provide a valve intended primarily as a rail washer valve but one which is susceptible of general use and makes possible the shutting off of the steam pressure from a boiler with which it is connected and the subsequent dismantling of the valve for repairs, thus making unnecessary the reduction of boiler pressure, or dissipation of the same when repairs are to be made to the valve equipment; to provide a valve which will prevent its being operated except as an opening and closing valve on the boiler, at any time other than when repairs upon it or dismantling for cleaning is to be done; and to provide a valve which is of simple form and therefore susceptible of cheap manufacture.

With this object in view, the invention consists in a construction and combination of parts of which a preferred embodiment is illustrated in the accompanying drawing but to which embodiment the invention is not to be restricted. Continued use in practice may dictate certain changes or alterations and the right is claimed to make any which fall within the scope of the annexed claims.

Figure 1:
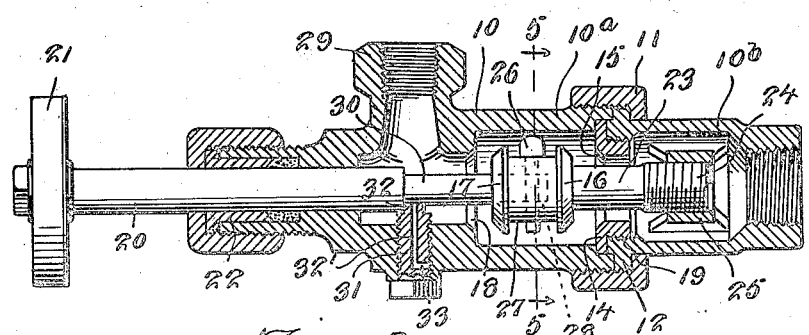
Figure 1 is a central longitudinal sectional view of a valve constructed in accordance with the invention, the valve being shown in open position.
Figure 2:
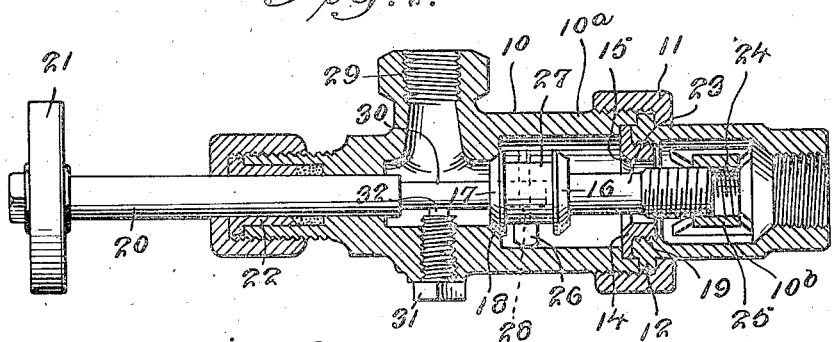
Figure 2 is a view similar to Figure 1 showing the valve in closed positon.

The valve constituting the invention comprises a casing 10 composed of two sections 10<sup>a</sup> and 10<sup>b</sup>, of which the latter is designed for connection with the boiler in conjunction with which the valve is used. The two casing sections may be connected in any acceptable manner and in the illustrated embodiment this is accomplished by means of a coupling nut 11 which encircles the casing section 10<sup>b</sup> to abut a shoulder formed by a peripheral rib 12 on the latter. The rib 12 abuts the end of the casing section 10<sup>a</sup>, so that when the coupling nut is tightened, this nut being threadingly engaged with the peripheral threads on the section 10<sup>a</sup>, the casing sections 10<sup>a</sup> and 10<sup>b</sup> become tightly coupled.

Removably seated in the end of the section 10<sup>b</sup> is a ring 14 formed with a valve seat 15, for engagement with the valve member 16. The remote end of the chamber in which the valves 16 and 17 are housed is formed with a valve seat 18 for engagement with the valve 17. The valve ring 14 is threadingly engaged with the section 10<sup>b</sup> as indicated at 19.

The stem 20, on which is mounted the usual hand wheel 21, extends through a stuffing box 22, of conventional form, in the section 10<sup>a</sup>, and this stem has connected with it the valve member 17. The stem 23 with which the valve member 16 is connected, is threadingly engaged as indicated at 24, in the eye of a spider 25, formed in the section 10<sup>b</sup>. To provide for the conventional direction of movement in shifting the valve to open and closed positions, the threaded portion 24 of the stem 23 is provided with left hand threads, so that when the hand wheel is turned left-handedly, the valve 16 is advanced toward the seat 15, since the two valve members are coupled by means of a coupling pin 26 which extends through a socket portion 27 of the valve member 16 and through a pilot portion 28 of the valve member 17, this pilot portion entering the socketed portion. Thus, when angular or turning movement is imparted to the valve 17 by the rotation of the stem 20, angular or turning movement to the stem 23 is imparted in consequence. If the hand wheel 21 is turned right-handedly, the valve 17 will be advanced toward its seat 18 by reason of the employment of left hand threads as the threads 24. Unseating movement of the valve 17 is secured by imparting reverse turning movement to the hand wheel 21. When the valve is in use, the opening and closing positions are effected by bringing the valve 17 into engagement with the seat 18 or moving it out of engagement with said seat. The outlet from the valve casing is indicated at 29. When the valve 17 is unseated, therefore, steam passes from the boiler through the casing section 10<sup>b</sup>, past the spider 25 and into the section 10<sup>a</sup>, passing the valve 17 if it be unseated and out through the outlet 29.

Assuming it is desired to repair the valve the reverse turning movement imparted to the stem 20 is continued until the valve 16 is moved into engagement with the seat 15, when steam from the boiler is shut off at this point. The valve casing section 10<sup>a</sup> may be then separated from the section 10<sup>b</sup> by releasing the coupling nut 11. Sliding the casing 10<sup>a</sup> along the stem, until the pin 26 is exposed, the latter may be withdrawn and thus the two valve members separated. The necessary repairs to the valve may be proceeded with, after which the parts may be recoupled.

The head of the pin 26 moving close to the interior surface wall of the section 10ª as the valve is operated, is prevented from being displaced, so that the two valve members remain coupled until the casing sections are separated.

Figure 3:
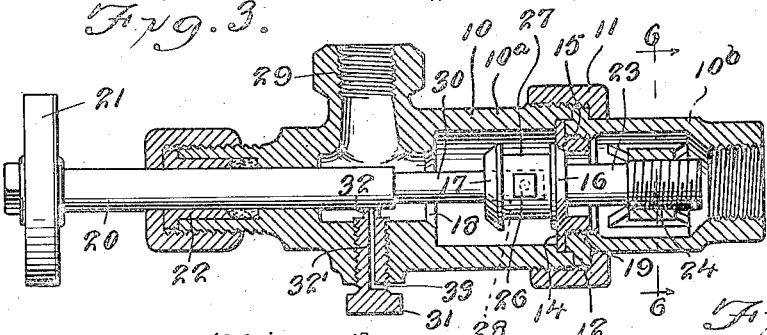
Figure 3 is a view similar to Figure 1 but showing the valve in the emergency position.
Figure 4:
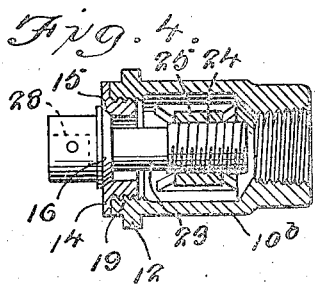
Figure 4 is a sectional view of one of the casing elements.
Figures 5, 6:
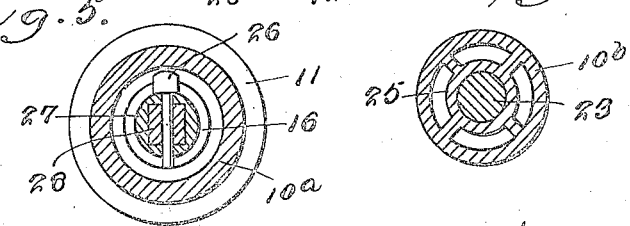
Figure 5 is a sectional view on the plane indicated by the line 5—5 of Figure 1.
Figure 6 is a sectional view on the plane indicated by the line 6—6 of Figure 3.

In order that the valve 16 may not be moved into engagement with its seat, except when it is desired for the purpose of dismantling the valve, the stem 20 is reduced in diameter as indicated at 30, thus leaving a shouldered portion at a fixed distance from the valve member 17. A plug 31 is threaded through the side wall of the casing section 10ª and has a reduced extremity 32 that moves into obstructing relation to the shouldered portion of the stem when the plug is screwed home. Thus, axial movement of the stem is determined by the length of the reduced portion which is just sufficient to permit seating and unseating of the valve 17. When it is desired to seat the valve member 16 on the seat 15, the plug 31 is retracted, as shown in Figure 3, when it is out of obstructing relation to the stem and the latter may be moved axially to engage the valve member with the seat 15, when dismantling of the valve structure may take place.

The plug 31 is formed with a longitudinal channel 32' communicating with a lateral channel 33, this latter being disposed in a threaded hole in the casing when the plug is seated but being exposed when the plug is unseated to permit free axial movement of the same. These channels constitute vents for dissipating any pressure that may be present in the valve at the time the dismantling operation is to take place.

The invention having been described, what is claimed as new and useful is:

1. A valve comprising coupled casing sections of which a valve seat is formed in each, a sectional valve stem threadingly mounted in one of the casing sections and slidingly mounted in the other, a valve carried by each stem section for engaging one of the valve seats, and means coupling the stem sections together and consisting of a removable diametrical pin inserted through registering openings in the stem sections.

2. A valve comprising coupled casing sections of which each is formed with a valve seat, a stem section threadingly engaged with one casing section, a second stem section slidingly mounted in the other casing section, coupling means for the casing sections, and valves carried one by each of the stem sections and provided with stem section coupling means disposed between them.

3. A valve comprising coupled casing sections of which each is formed with a valve seat, a stem section threadingly engaged with one casing section, a second stem section slidingly mounted in the other casing section, coupling means for the casing sections, and valves carried one by each of the stem sections and provided with stem section coupling means disposed between them and consisting of a socket carried by one valve and a pilot by the other, the pilot entering said socket, and a diametrical pin extending through registering holes in the walls of said socket and in said pilot.

4. A valve comprising coupled casing sections, each having a valve seat formed therein, a pair of valves disposed in one casing section and arranged for engagement each with one of said valve seats, stem sections connected one with each of said valves, one of said stem sections being threadingly engaged with one of the casing sections and the other slidingly engaged with the other casing section, and removable coupling means for the stem sections.

5. A valve comprising coupled casing sections, each having a valve seat formed therein, a pair of valves disposed in one casing section and arranged for engagement each with one of said valve seats, stem sections connected one with each of said valves, one of said stem sections being threadingly engaged with one of the casing sections and the other slidingly engaged with the other casing section, and removable coupling means for the stem sections, and an adjustable stop normally operatively connected with one of the stem sections to limit the axial movement of said stem section whereby one of said valves only may normally be engaged or released from its seat.

6. A valve comprising coupled casing sections, each having a valve seat formed therein, a pair of valves disposed in one casing section and arranged for engagement each with one of said valve seats, stem sections connected one with each of said valves, one of said stem sections being threadingly engaged with one of the casing sections and the other slidingly engaged with the other casing section, and removable coupling means for the stem sections, and an adjustable stop normally operatively connected with one of the stem sections to limit the axial movement of said stem section whereby one of said valves only may normally be engaged or released from its seat, said stop being movable out of operative connection with said stem section to permit seat engagement of the other valve, said stop being formed with a duct to vent the valve casing when moved out of said operative position.

WILLIAM T. GILES.